United States Patent [19]

Meeks

[11] Patent Number: 5,216,308
[45] Date of Patent: Jun. 1, 1993

[54] MAGNETIC BEARING STRUCTURE PROVIDING RADIAL, AXIAL AND MOMENT LOAD BEARING SUPPORT FOR A ROTATABLE SHAFT

[75] Inventor: Crawford R. Meeks, Woodland Hills, Calif.

[73] Assignee: Avcon-Advanced Controls Technology, Inc., Northridge, Calif.

[21] Appl. No.: 825,984

[22] Filed: Jan. 27, 1992

Related U.S. Application Data

[63] Continuation-in-part of Ser. No. 522,209, May 11, 1990, Pat. No. 5,111,102, which is a continuation-in-part of Ser. No. 356,413, May 25, 1989, abandoned.

[51] Int. Cl.$^5$ .............................................. H02K 7/09
[52] U.S. Cl. ................................... 310/90.5; 318/615; 324/207.23
[58] Field of Search ............... 310/90.5; 318/560, 611, 318/615, 624; 324/207.22, 207.23

[56] References Cited

U.S. PATENT DOCUMENTS

| | | |
|---|---|---|
| 3,890,019 | 6/1975 | Boden et al. |
| 3,976,339 | 8/1976 | Sabnis |
| 4,037,886 | 7/1977 | Boden et al. |
| 4,072,370 | 2/1978 | Wasson |
| 4,080,012 | 3/1978 | Boden et al. |
| 4,088,379 | 5/1978 | Perper ................. 310/90.5 |
| 4,090,745 | 5/1978 | Dohogne ............. 310/90.5 |
| 4,114,960 | 9/1978 | Habermann ......... 310/90.5 |
| 4,128,280 | 12/1978 | Purtschert |
| 4,340,261 | 7/1982 | Wehde ................. 310/90.5 |
| 4,405,286 | 9/1983 | Studer |
| 4,563,046 | 1/1986 | Shimamoto |
| 4,583,794 | 4/1986 | Takahara et al. |
| 4,597,613 | 7/1986 | Sudo |
| 4,626,754 | 12/1986 | Habermann et al. |
| 4,634,191 | 1/1987 | Studer ................. 310/90.5 |
| 4,642,500 | 2/1987 | Higuchi ............... 310/90.5 |
| 4,652,780 | 3/1987 | Murakami et al. |
| 4,806,835 | 2/1989 | Habermann |
| 4,811,906 | 3/1989 | Prus |
| 4,812,694 | 3/1989 | Fremery |
| 4,812,757 | 3/1989 | Meins et al. |
| 4,839,550 | 6/1989 | Mizuno ................ 310/90.5 |
| 4,841,184 | 6/1989 | Chen et al. |

(List continued on next page.)

FOREIGN PATENT DOCUMENTS

| | | |
|---|---|---|
| 2841256 | 4/1980 | Fed. Rep. of Germany. |
| 59-43220 | 3/1984 | Japan. |

Primary Examiner—R. Skudy
Attorney, Agent, or Firm—Kelly, Bauersfeld & Lowry

[57] ABSTRACT

A magnetic bearing structure utilizes two adjacent electromagnetic bearings to provide controlled radial, thrust and moment load support of a shaft relative to a housing. The first bearing generates a high density controllable magnetic field to radially flux couple the shaft to the housing. A second bearing generates a high density controllable magnetic field to axially flux couple the shaft to the housing. In a preferred form, the first bearing circumferentially surrounds the shaft and includes a stator ring associated with the housing which holds several electromagnetic coils radially spaced from the shaft. Power supplied to the coils generates a radially polarized electromagnetic field surrounding the shaft. A pair of additional electromagnetic coils, or permanent magnets, circumferentially extend around the shaft to generate an axially polarized, constant flux magnetic field. Substantially all of the magnetic flux generated by both flux generation sources is directed radially through a primary air gap between the shaft and the stator ring to provide radial support for the shaft. The second bearing includes two coil housings between which a thrust disc associated with the shaft extends. Two arcuate permanent magnets within the disc generate a constant flux radially polarized magnetic field. Three pairs of electromagnetic coils, each subtending a 120 degree arc, are placed within the coil housings to generate an axially polarized, controllable magnetic field. Magnetic flux generated by the permanent magnets and the paired electromagnetic coils axially couples the shaft to the housing.

30 Claims, 4 Drawing Sheets

U.S. PATENT DOCUMENTS

| | | |
|---|---|---|
| 4,866,318 | 9/1989 | Habermann et al. |
| 4,866,380 | 9/1989 | Meins et al. |
| 4,872,357 | 10/1989 | Vaillant De Guelis et al. |
| 4,879,500 | 11/1989 | Kanemitsu |
| 4,885,491 | 12/1989 | Hiyama et al. |
| 4,889,039 | 12/1989 | Miller |
| 4,891,832 | 1/1990 | Ebersberger |
| 4,894,922 | 1/1990 | Lovelock |
| 4,895,023 | 1/1990 | Roubinet et al. |
| 4,900,962 | 2/1990 | Hockney et al. |
| 4,908,558 | 3/1990 | Lordo et al. |
| 4,910,449 | 3/1990 | Hiyama et al. |
| 4,912,387 | 3/1990 | Moulds, III |
| 4,918,345 | 4/1990 | Vaillant de Guelis et al. |
| 4,920,290 | 4/1990 | Murakami et al. |
| 4,928,561 | 5/1990 | Fouche |
| 4,929,158 | 5/1990 | Girault |
| 4,942,321 | 7/1990 | Kanemitsu |
| 4,946,345 | 8/1990 | Watanabe et al. |
| 4,947,067 | 8/1990 | Habermann et al. |
| 4,956,571 | 9/1990 | Gordon et al. |
| 4,964,147 | 10/1990 | Laurent et al. |
| 4,969,803 | 11/1990 | Turanskyj |
| 4,976,177 | 12/1990 | Fouche |
| 4,982,126 | 1/1991 | Jolivet et al. |
| 4,983,869 | 1/1991 | Vaidya et al. |
| 4,988,906 | 1/1991 | Littlefield |
| 5,005,297 | 4/1991 | Aehnelt et al. |
| 5,010,563 | 4/1991 | Laurent et al. |
| 5,012,359 | 4/1991 | Kohno et al. |
| 5,021,697 | 6/1991 | Kralick |
| 5,027,280 | 6/1991 | Ando et al. |

MAGNETIC BEARING STRUCTURE PROVIDING RADIAL, AXIAL AND MOMENT LOAD BEARING SUPPORT FOR A ROTATABLE SHAFT

RELATED APPLICATION

This is a continuation-in-part of U.S. Pat. application Ser. No. 07/522,209, which was filed May. 11, 1990 and entitled MAGNETIC BEARING STRUCTURE, now U.S. Pat. No. 5,111,102 which was a continuation-in-part of U.S. Pat. application Ser. No. 07/356,413, which was filed May 25, 1989, abandoned, and entitled MAGNETIC BEARING STRUCTURE AND METHOD.

BACKGROUND OF THE INVENTION

This invention relates generally to improvements in magnetic bearing structures. More particularly, the present invention relates to a magnetic bearing structure which utilizes a first bearing to radially flux couple a rotatable member to a stationary member, and a second bearing to axially flux couple the rotatable member to the stationary member in such a manner as to provide controlled radial, thrust and moment load support of the rotatable member relative to the stationary member.

Electromagnetic bearings are highly effective for supporting a body, such as a rotating shaft, which is effectively floated or levitated by magnetic fields. In this way the rotating shaft has no frictional contact with any stationary structure, thereby permitting relatively friction free rotation of the shaft or rotation of a body about the shaft. This arrangement possesses the obvious advantage that there is no mechanical abrasion, which results in reduced mechanical noise and durability not available with other types of bearing structures. Moreover, because of the reduced frictional effects which would otherwise be encountered with conventional bearing structures, it is possible to obtain higher speeds of rotation with electromagnetic bearings.

Magnetic bearings typically require little maintenance and readily lend themselves to operation in hostile environments such as in connection with corrosive fluids where other conventional bearings would be destroyed or rendered inoperable. Further, magnetic bearings are suitable for supporting moving bodies in a vacuum, such as in outer space, or in canned pumps where the pump rotor must be supported without the use of physically contacting bearings.

Conventional electromagnets utilized for energizing levitation gaps are inefficient in that they require a substantial amount of electrical power to generate the required electromagnetic field. In general, prior electromagnetic bearings require large electromagnetic coils and electronic-controlled circuitry which have been found to be inherently inefficient. There have been some proposals to use permanent magnets in combination with electromagnets in order to provide greater stabilization and control. However, the conventional prior designs, which utilize both electromagnets and permanent magnets, are inefficient from a spacial standpoint and are considerably complex.

One of the primary considerations in the development of magnetic bearing structures is to eliminate so-called air gaps. The so-called air gaps form a portion of the magnetic flux pathway of the electromagnets and permanent magnets, and provide a bridge between a supporting structure and a levitated structure. In actuality, some air gaps must be tolerated in order to position a suspended or rotatable body. Thus, air gaps to some extent cannot be avoided, but it is desirable to reduce air gaps to an absolute minimum.

From a pure physics standpoint, an air gap introduces great inefficiency into any type of magnetic structure. An air gap is about 2,000 times less efficient than an iron core medium for transmitting magnetic flux. Thus, in terms of inefficiency, a magnetic bearing structure which has an air gap of 0.1 inch is far more inefficient than a magnetic bearing which has an iron gap of 20 inches.

In addition, it is important to overcome the conductivity constraints of permanent magnets. Essentially, permanent magnets are very poor conductors for a magnetic flux, even though they generate magnetic flux. The most efficient permanent magnets available are the rare earth alloy magnets. Such permanent magnets, however, have a very low magnetic permeability and they behave in much the same manner as air gaps in the magnetic circuit. The low permeability of rare earth alloy magnets requires significant power to drive electromagnetic fields through the permanent magnets, thereby resulting in low electrical efficiencies. Thus, it is undesirable to transmit an electromagnetic field through a permanent magnet.

Moreover, in some working environments it is desirable to provide radial, thrust and moment load support to a shaft at or adjacent to one end of the shaft only, while permitting rotation of the shaft relative to a stationary housing. Such shaft support lends itself to gimballed mirror, gimballed sensor or gimballed optics configurations. Further, it is desirable to minimize the number of controls required for complete shaft support and control.

Accordingly, there has been a need for a novel electromagnetic bearing structure which utilizes a combination of radially polarized and axially polarized magnetic fields to produce a compact and spacially efficient structure which is light weight and obtains a high power efficiency. Additionally, there exists a need for an electromagnetic bearing structure wherein magnetic efficiency of the device is optimized b minimizing air gaps between the levitated and support structures, and wherein the electromagnetic coils are not required to provide magnetomotive forces to drive magnetic flux through permanent magnets. Further, such an electromagnetic bearing structure is needed which can utilize a permanent magnet bias to reduce power consumption to the controlling electromagnetic coils, and which lends itself to concurrent use of electromagnets and permanent magnets for the purpose of providing a high density, constant magnetic flux between associated structures. Moreover, an electromagnetic bearing structure is needed which is scalable, can exploit advances in permanent magnet technology, and can provide full radial, thrust and moment load support to a rotatable shaft at one end thereof. The present invention fulfills these needs and provides other related advantages.

SUMMARY OF THE INVENTION

The present invention resides in an improved electromagnetic bearing structure for supporting a rotatable member in a suspended or levitated position with respect to a stationary member. The bearing structure comprises, generally, a first bearing associated with the stationary member for generating a high density controllable magnetic field surrounding a first portion of the rotatable member, and for radially flux coupling the rotatable member to the stationary member. Further, a second bearing associated with the stationary member is provided for generating a high density controllable magnetic field surrounding a second portion of the rotatable member, and for axially flux coupling the rotatable member to the stationary member. The first and second bearings cooperatively provide controlled radial, thrust (axial) and moment load support of the rotatable member relative to the stationary member. The arrangement of the electromagnetic bearing structure of the present invention uniquely combines two adjacent electromagnetic bearings to provide five degree-of-freedom control of a rotatable shaft without any other bearing support system. Thus, a compact and spacially efficient system is produced which is lightweight and which has a high degree of power efficiency.

In its most basic form, the electromagnetic bearing structure of the present invention utilizes bearings which each generate a high density magnetic flux directed through a minimum number of air gaps between the rotatable member and the stationary member. This provides a generally uniform magnetic field surrounding a portion of the rotatable member which, under perfect conditions, could theoretically suspend or levitate the rotatable member with respect to the stationary member. Such perfect conditions rarely exist, and certainly do not persist in an operating environment, and thus any displacement of the rotatable member relative to the stationary member will cause the rotatable member to be drawn into contact with a portion of the stationary member. This is known as the "negative spring" effect created by the constant magnetic field.

In order to counteract the "negative spring" effect, the present invention utilizes controllable, variable flux electromagnetic fields in connection with each of the bearings to stabilize the rotatable member in an optimum centered position relative to the stationary member. Variations in the positioning of the rotatable member are neutralized by an active electromagnetic servo control system which produces a "positive spring" effect, that is, a high stiffness restoring force. The present invention provides sensors which are positioned to detect displacement of the rotatable member relative to the stationary member. The servo control circuit can correct for any displacement of the levitated member by controlling the electromagnetic field forces. In this way, signals from the position sensors enable the servo control system to stabilize the rotatable member and maintain it in an optimal centered position.

In a preferred form of the invention, a five axis servo control system is utilized to levitate and provide support for the rotatable member. This five axis servo control system requires only two position sensors to determine radial load displacement of the rotatable member, and only three position sensors to determine axial and moment load displacement thereof. The system is fully capable of controlling the electromagnetic bearings to compensate for radial, thrust and moment loads applied to the rotatable member, to maintain it in an optimal centered position relative to the stationary member.

The first bearing, which radially flux couples the rotatable member to the stationary member, comprises means associated with the stationary member for generating a radially polarized, controllable electromagnetic field surrounding a portion of the rotatable member, and means associated with the stationary member for generating an axially polarized magnetic field. Means are also provided for directing substantially all of the radially and axially generated magnetic flux radially through a single primary air gap between the rotatable member and the stationary member.

The electromagnetic field generating means includes an arcuately shaped ring of high magnetic flux permeability. The ring is preferably of a laminate construction to reduce the effects of eddy currents therein. A plurality of electromagnetic coils are circumferentially positioned about the ring and radially spaced from the rotatable member which, in the preferred embodiment, is a shaft.

The axially polarized magnetic field generating means is associated with the arcuate ring and circumscribes the rotatable member to generate a relatively constant magnetic flux through the arcuate ring and across the primary air gap. An arcuately shaped pole piece which extends axially outwardly from the arcuate ring is provided through which the magnetic flux generated by the axially polarized magnetic field generating means is directed axially relative to the arcuate ring and then re-oriented radially. In one embodiment, the axially polarized magnetic field generating means include an electromagnetic coil situated adjacent to the arcuate ring and circumscribing the rotatable member. In another form, the axially polarized magnetic field generating means includes a permanent magnet likewise situated adjacent to the arcuate ring. In both preferred embodiments, the magnet is spaced radially outwardly from the electromagnetic coils and is linked magnetically to the rotatable member through the arcuate ring across the primary air gap.

In cases where the rotatable member may be of a material having a low magnetic flux permeability, a magnetically permeable armature is provided as a sleeve around the rotatable member. The armature preferably extends between and faces the arcuate ring and the pole piece.

The second bearing, which axially flux couples the rotatable member to the stationary member, utilizes a thrust disc which extends radially outwardly from the body of the rotatable member. Means associated with the rotatable member and circumscribing a portion of the thrust disc are provided for generating a radially polarized magnetic field. First and second means associated with the stationary member and adjacent to first and second sides of the thrust disc, generate an axially polarized, controllable electromagnetic field. Further, means are provided for directing substantially all magnetic flux from the first and second axially polarized electromagnetic field generating means and the radially polarized magnetic field generating means, axially between the thrust disc and the stationary member, to provide magnetic flux coupling of the rotatable member to the stationary member.

The radially polarized magnetic field generating means includes two arcuately shaped permanent magnets which are radially spaced from one another and form a portion of the thrust disc. The permanent magnets are linked magnetically to the stationary member such that the radially directed flux from the permanent magnets is re-oriented to axially pass through two air gaps to create a high density constant flux magnetic field linking the rotatable member to the stationary member.

The first and second means for generating an axially polarized electromagnetic field each include at least three electromagnetic coils circumferentially positioned about the rotatable member and axially spaced from the thrust disc. The stationary member includes spaced apart, facing first and second coil housings which circumferentially surround a portion of the rotatable member and between which the thrust disc is situated. Each electromagnetic coil of the first electromagnetic field generating means is electrically connected and paired with a matching electromagnetic coil of the second electromagnetic field generating means. Each of the electromagnetic coils is axially aligned with the permanent magnets of the thrust disc. This arrangement magnetically links the disc to the coil housings and provides a magnetic flux path for the electromagnetically generated flux around the permanent magnets and the electromagnetic coils.

A disc position sensor is provided for each matching pair of electromagnetic coils. Each such sensor is connected to a servo control system for controlling the positioning of the thrust disc between the matching pair of coils by varying the magnetic flux generated thereby.

The plurality of electromagnetic coils circumferentially positioned about the ring in the first bearing, and the matching pairs of electromagnetic coils in the second bearing are controlled through the servo control system in order to provide the desired amount of electromagnetic flux and to thereby control the electromagnetic fields surrounding the rotatable member. The construction of the electromagnetic bearing structure of the present invention permits the flux generated by the electromagnetic coils to be varied in order to obtain optimum positioning of the rotatable member, without requiring the controllable, variable magnetomotive force to drive flux through a permanent magnet. In this manner, the structure maintains a high degree of power efficiency Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the drawings for purposes of illustration, the present invention is concerned with an improved electromagnetic bearing structure, generally designated in the accompanying drawings by the reference number 10. The bearing structure 10 comprises a stationary outer housing 12 and a cylindrical rotatable shaft 14 which extends axially through the housing 12. A first bearing 16 is associated with the housing 12 for generating a high density controllable magnetic field surrounding an adjacent portion of the shaft 14, and for radially flux coupling the shaft to the housing. A second bearing 18, which is adjacent to the first bearing 16 and also associated with the housing 12, generates a high density controllable magnetic field surrounding a second portion of the shaft 14, to axially flux couple the shaft to the housing. The first and second bearings 16 and 18 cooperatively provide controlled radial, thrust and moment load support of the shaft 14 to suspend or levitate the shaft within the housing 12.

The magnetic bearing structure 10 of the present invention is controlled by a five-axis servo control system, which is theoretically the minimum number of active controls required for complete shaft support and control. Only two position sensors need be associated with the first bearing 16 to compensate for radial displacement of the shaft 14, and only three additional sensors need be associated with the second bearing 18 to compensate for axial and moment displacement of the shaft.

Figure 1:
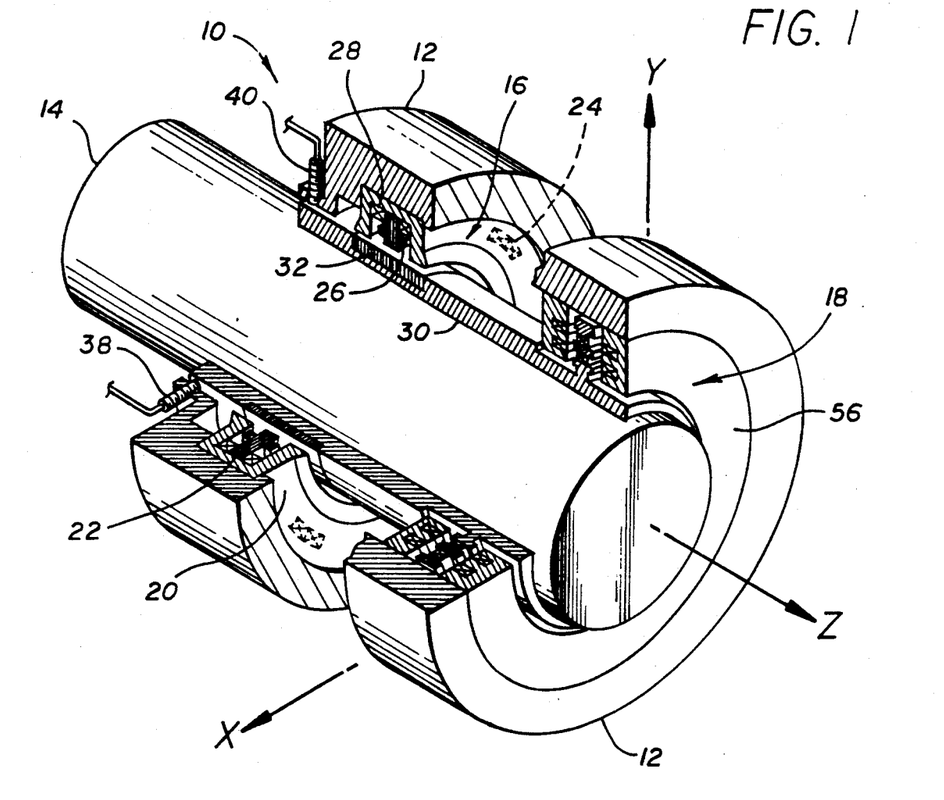
FIG. 1 is a fragmented perspective view of an electromagnetic bearing structure embodying the invention, illustrating the use of two electromagnetic bearings adjacent to an end of a rotatable shaft which provide radial, thrust and moment load support to the shaft, wherein a first bearing radially flux couples the shaft to a housing, and a second bearing axially flux couples the shaft to the housing.
Figure 2:
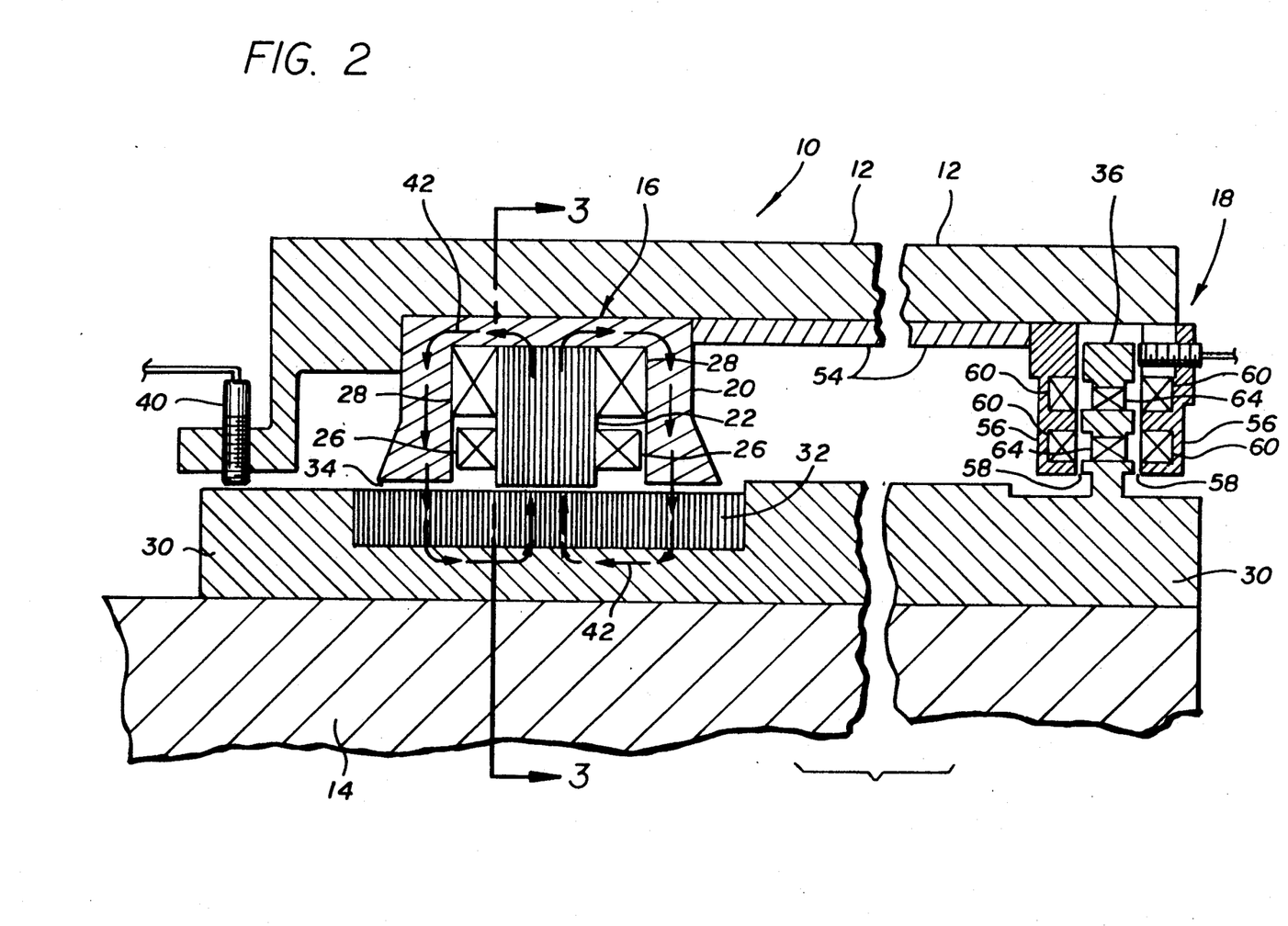
FIG. 2 is an enlarged fragmented sectional elevational view of the electromagnetic bearing structure illustrated in FIG. 1, showing, in connection with a first bearing, an exemplary magnetic flux path generated by axially polarized constant flux electromagnetic coils which circumscribe the shaft, wherein substantially all of the axially directed flux is re-oriented to create a high density magnetic field across a primary air gap for flux coupling the shaft to the stationary housing.
Figure 3:
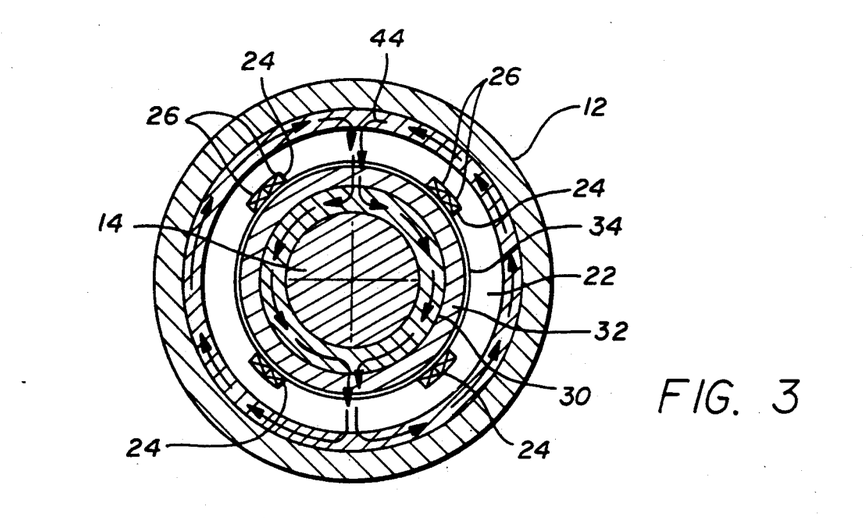
FIG. 3 is a reduced sectional elevational view taken generally along the line 3—3 of FIG. 2, illustrating an exemplary magnetic flux path generated by radially polarized controllable electromagnetic coils of the first bearing.

In accordance with the present invention, and as illustrated best in FIGS. 1-3, the first bearing 16 comprises an arcuate pole piece 20, having a U-shaped cross-sectional configuration, fixed to the housing 12 and extending circumferentially about the shaft 14. An arcuate ring 22, preferably formed of laminated stacked plates and having high magnetic flux permeability, is centrally positioned within the pole piece 20. The ring 22 is provided with a plurality of circumferentially spaced apart individual slots 24 for receiving active control electromagnetic coils 26. Two additional electromagnetic coils (homopolar coaxial bias coils) 28 are situated adjacent to and extend coextensively circumferentially about the shaft 14 with the pole piece 20 and the arcuate ring 22.

For purposes of illustration, the shaft 14 is presumed to be of a material having low magnetic flux permeability. In such cases, an armature or sleeve 30 is placed over that portion of the shaft 14 encircled by the magnetic bearing structure 10, and the armature is preferably formed of a high permeability magnetic material. The armature 30 is provided with a rotor section 32 which, like the ring 22, is formed of laminated stacked plates having a high magnetic flux permeability. The spacing between the rotor section 32 and the facing surfaces of the arcuate ring 22 and the pole piece 20 forms a primary air gap 34 through which substantially all of the magnetic flux generated by the first bearing 16 is directed. The armature 30 further includes a radially extending thrust disc 36 which will be discussed below in connection with the second bearing 18.

An X-axis sensor 38 and a Y-axis position sensor 40 are provided for sensing, respectively, X and Y-axis displacement of the shaft 14 relative to the housing 12. The purpose of the sensors 38 and 40 is to detect movement of the shaft 14 radially from its optimal centered position. When the position sensors 38 and 40 detect an eccentricity of the shaft, they cause generation of electrical signals to a servo circuit which, upon receipt of such input signals, provides a restoring force by generating a signal to the active control electromagnetic coils 26 in such a manner so as to reposition the shaft 14 in its optimum centered position.

With the foregoing basic construction of the first bearing 16 in mind, its function will be described in greater detail. The homopolar coaxial bias coils 28, generate an axially polarized magnetic field having a magnetic flux path illustrated by the arrows having a reference number 42 (FIG. 2). The homopolar coaxial bias coils 28 generate a relatively constant, high density magnetic flux which is conducted through the pole piece 20 axially outwardly from the arcuate ring 22 and then radially toward the shaft 14. The flux path 42 spans the primary air gap 34, is conducted through the rotor section 32 to the armature 30, and then is redirected axially and then radially across the primary air gap 34 toward the ring 22. It should be noted that the magnetic flux 42 generated by the axially polarized homopolar coaxial bias coils 28 is directed radially through only a single primary air gap 34 to provide magnetic flux coupling of the shaft 14 to the housing 12. Under perfect conditions, and assuming no thrust (axial) or moment loading upon the shaft 14, if the shaft were to be precisely centered within the housing 12 so that a uniform air gap 34 existed completely around the shaft, then, theoretically, the high density magnetic field produced by the homopolar coaxial bias coils 28 would create a radially directed force system which was metastable. However, any eccentricity of the shaft 14 will cause it to be drawn to one side or the other within the housing 12. This is the so-called "negative spring" effect of the constant magnetic field provided by the electromagnetic coils 28.

The active control electromagnetic coils 26 positioned about the shaft 14 by the arcuate ring 22 are controlled by a servo circuit to counteract the "negative spring" effect and produce a "positive spring," that is, a high stiffness restoring force which keeps the shaft 14 centered between the arcuate ring 22. The reference number 44 identifies an exemplary magnetic flux path of the active control electromagnetic coils 26 (FIG. 3). Each of the electromagnetic coils 26 is capable of generating a radially polarized, controllable electromagnetic field, wherein the flux path 44 is directed across the primary air gap 34 and conducted circumferentially about the shaft 14 through the armature 30 and the highly permeable arcuate ring 22.

In use, the axially polarized magnetic field generated by the homopolar coaxial bias coils 28 tends to cause the shaft 14 to displace from a true centered position and into engagement with the arcuate ring 22. Such displacement is sensed by the X-axis and Y-axis position sensors 38 and 40 which provide input to a servo circuit. An exemplary servo circuit is described in U.S. Pat. No. 5,111,102. The servo circuit selectively controls electrical current to the active control electromagnetic coils 26 positioned by the arcuate ring 22, in order to provide a positive gradient which keeps the shaft 14 in a true centered position. The greater the displacement of the shaft 14, the greater the restoring force generated through the use of the servo circuit and the electromagnetic coils 26. Thus, a high density magnetic field is produced through the primary air gap 34, which produces a radial force system which is metastable when the shaft is centered within the housing 12.

The homopolar coaxial bias coils 28 provide a high density magnetic field through the air gap 34 which is necessary to support the shaft 14 in a levitated or suspended position within the housing 12. The active control electromagnetic coils 26 provide for stabilization of the shaft 14. This arrangement results in a much more efficient bearing structure than previous types of electromagnetic bearing structures.

Figure 7:
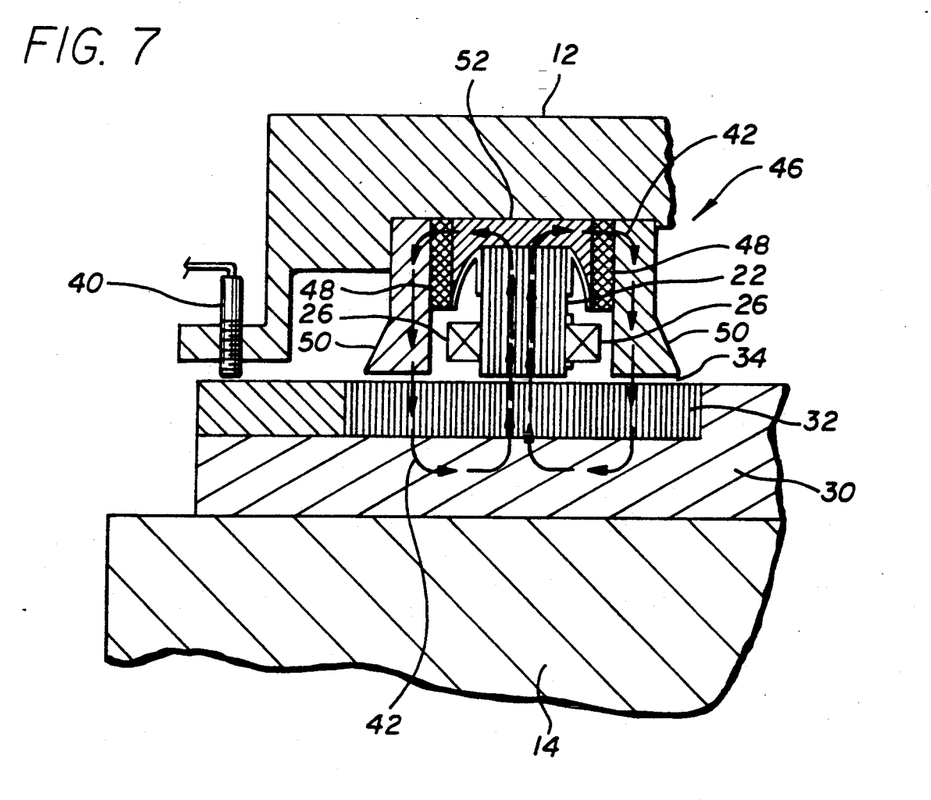
FIG. 7 is a fragmented sectional elevational view similar to that illustrated in FIG. 2, showing another embodiment of the first bearing which provides radial support to the shaft.

A second preferred form of the first bearing 16 is illustrated in FIG. 7, wherein functionally equivalent elements retain the same numbering as set forth in connection with the first embodiment of FIGS. 1–3. In FIG. 7, wherein the alternative first bearing is assigned the reference number 46, the homopolar coaxial bias coils 28 of the first bearing 16 (FIGS. 1–3) are replaced by a pair of axially polarized permanent magnets 48 which coextensively surround, together with the pole pieces 50, the arcuate ring 22 and the shaft 14. It will be noted from FIG. 7 that the arcuate pole pieces 50 and the arcuate permanent magnets 48 situated on each side of the arcuate ring 22 are magnetically linked to one another and the arcuate ring by means of an arcuately shaped magnetically permeable intermediate section 52. This structure comprising the pole pieces 50, the permanent magnets 48 and the intermediate section 52 provide the means for generating an axially polarized constant flux magnetic field around the shaft 14, with a flux path 42 similar to that generated by the homopolar coaxial bias coils 28 shown in FIG. 2.

In the illustrated embodiments of the first bearing 16 and 46, an axially polarized magnetic field is generated by either the homopolar coaxial bias coils 28 (FIGS. 1–3), or the permanent magnets 48 (FIG. 7). This axially polarized magnetic field provides a high density, constant magnetic flux which is directed radially across the primary air gap 34 between the pole pieces and the rotor section 32, and subsequently between the rotor section 32 and the arcuate ring 22. This high density constant magnetic flux 42 provides the primary radial flux coupling of the shaft 14 to the housing 12. The active control electromagnetic coils 26, on the other hand, whose flux path 44 is quite different from the constant flux path 42, are controllable through a servo system to provide for stabilization of the shaft 14 within the housing 12.

Reference will now be made to the second bearing 18 illustrated in FIGS. 1, 2 and 4-6. The second bearing 18 is situated generally adjacent to the first bearing 16 and is spaced therefrom by a spacer 54. The second bearing 18 generally surrounds the thrust disc 36 provided by the armature 30.

More particularly, two stationary coil housings 56 extend radially from the stationary outer housing 12 toward the shaft 14. The coil housings 56 generally surround the thrust disc 36 and are axially spaced therefrom by very small air gaps 58 of approximately 0.007 inch. A set of six electromagnetic coils 60 are set into the coil housings 56. In this regard, three "race track" shaped coils 60 are set into each of the coil housings 56 and subtend approximately a 120° arc. The coils 60 are connected in pairs, with each 120 degree quadrant coil 60 connected to a matching coil provided in the opposite coil housing 56 spanning the same 120 degree quadrant. Each pair of matched electromagnetic coils 60 are connected to have opposite polarity so that the coil pairs operate in concert to develop additive forces on the thrust disc 36, as shown by the flux arrows 62 in FIG. 4.

Figure 5:
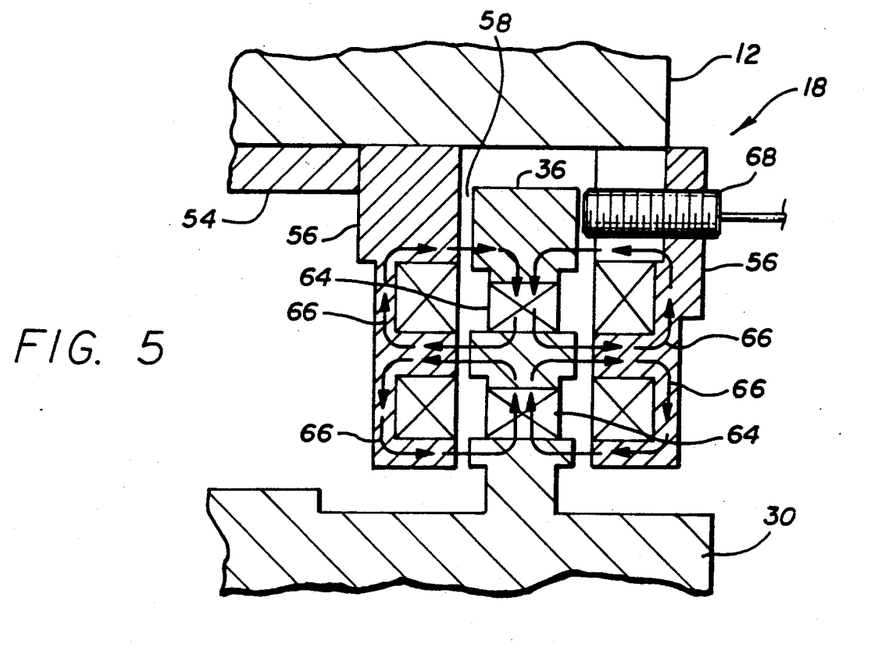
FIG. 5 is an elevational view of the second bearing similar to FIG. 4, illustrating exemplary magnetic flux paths generated by radially polarized permanent magnets situated within a thrust disc positioned between the coil housings and forming a portion of an armature surrounding the rotatable shaft.

The thrust disc 36 is provided with two radially polarized permanent magnet rings 64 arranged so as to generate axially flowing magnetic fields in the air gap 58 between the coil housings 56 and the rotating thrust disc as shown by the flux path arrows 66 in FIG. 5. Like the homopolar coaxial bias coils 28 of FIG. 2 and the permanent magnets 48 of FIG. 7, the permanent magnet rings 64, which generate a radially polarized, constant flux magnetic field generally surrounding a portion of the shaft 14, provide the primary flux coupling of the housing 12 (and specifically the coil housings 56) to the shaft 14 (specifically the thrust disc 36).

Figure 4:
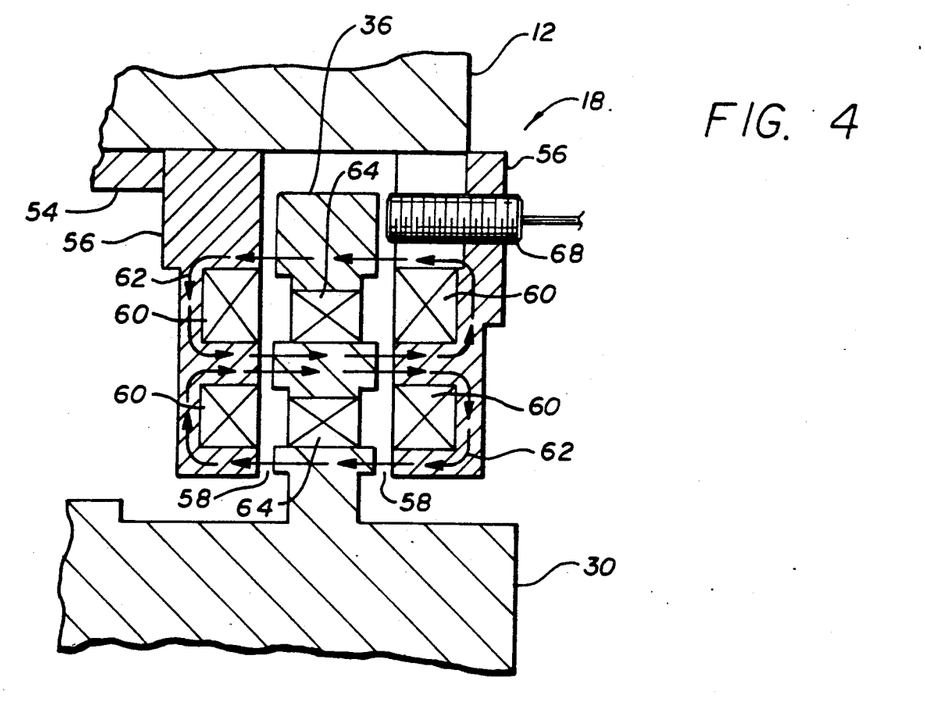
FIG. 4 is an enlarged elevational view of a second bearing illustrated in FIG. 2, showing exemplary magnetic flux paths generated by axially polarized controllable electromagnetic coils positioned within coil housings.

In operation, energizing any of the coil pairs 60 results in an electromagnetic flux 62 that produces changes in the total magnetic flux in the air gaps 58 surrounding the thrust disc 36. The changes add to or reduce the magnetic fields generated by the permanent magnet rings 64 in the associated air gaps 58. Consequently controllable magnetomotive forces are produced by modulating the current n the individual coil pairs 60. Energizing any one quadrant coil pair will produce both an axial force on the thrust disc 36 and a moment on the shaft 14 due to the non-symmetrical offset of the coil pairs 60 with respect to the axis of rotation of the shaft 14. Energization of all three of the coil pairs 60 simultaneously will produce a pure axial force on the thrust disc 36.

Figure 6:
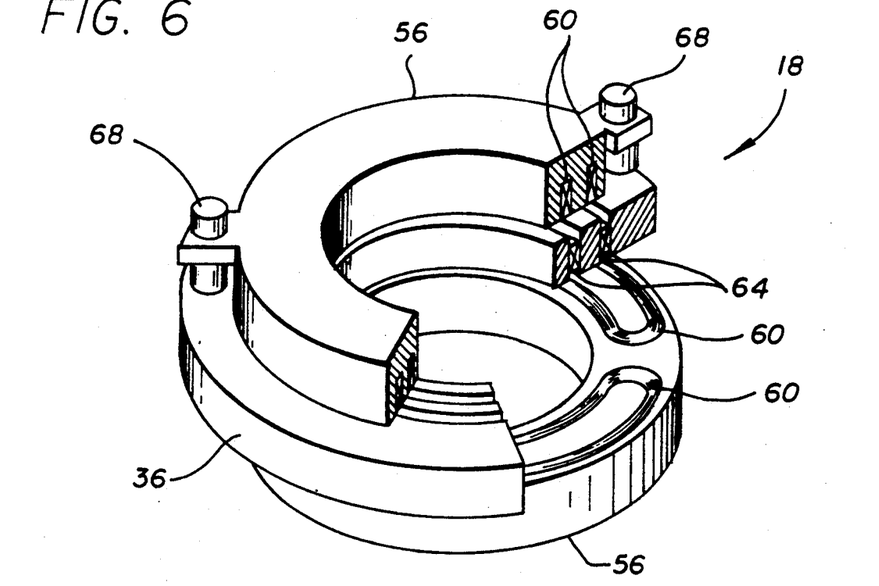
FIG. 6 is a fragmented perspective view of the second bearing illustrated in FIGS. 2, 4 and 5, showing the location of position sensors through a coil housing relative to the thrust disc, and the manner in which electromagnetic coils are situated within each coil housing.

Three Z-axis position sensors 68 are utilized in connection with the second bearing 18, and are positioned relative to the thrust disc 36 within one of the coil housings 56. One sensor 68 is provided for each of the 120° electromagnetic coil quadrants to detect the axial air gap between the thrust disc 36 and the supporting coil housing 56 at the center of the coil arc. By servo controlling the three electromagnetic coil pairs 60 to maintain constant air gaps 58, the second bearing 18 will create forces that will both center the thrust disc 36 within the axial air gaps 58 in the axial direction, and also maintain the thrust disc in a plane parallel to the stationary coil housing 56 air gap faces.

The second bearing 18, which is a thrust/moment load bearing, like the first or radial load bearing 16, is designed so that the electromagnetic flux 62 generated by the electromagnetic coil pairs 60 take a different path than the permanent magnet flux 66 generated by the permanent magnet rings 64. This greatly improves the electrical efficiency of the second bearing 18 because the electromagnetic coils 60 do not have to drive magnetic flux through the permanent magnet rings 64 which have a very high resistance to conducted magnetic fields.

From the foregoing it is to be appreciated that the improved electromagnetic bearing structure 10 of the present invention is capable of supporting a shaft 14 in a suspended position relative to a stationary body or housing 12 utilizing a first bearing 16 which generates a high density controllable magnetic field surrounding a first portion of the shaft and which radially flux couples the shaft to the housing, and a second bearing 18 adjacent to the first, which generates a high density controllable magnetic field surrounding a second portion of the shaft and which axially flux couples the shaft to the housing. Such a bearing structure 10 is capable of providing controlled radial, thrust and moment load support of the shaft 14 relative to the housing 12. Moreover, the disclosed structure produces very compact and spacially efficient systems which are light in weight and which yet have high power efficiency.

Although a particular embodiment of the invention has been described in detail for purposes of illustration, various modifications may be made without departing from the spirit and scope of the invention. Accordingly, the invention is not to be limited, except as by the appended claims.

I claim:

1. An electromagnetic bearing structure for supporting a rotatable member including a thrust disc with respect to a stationary member, the bearing structure comprising:

first bearing means associated with the stationary member, for generating a high density controllable magnetic field surrounding a first portion of the rotatable member, and for coupling the rotatable member to the stationary member through radially-directed magnetic flux; and second bearing means adjacent to the first bearing means and associated with the stationary member, for generating a high density controllable magnetic field surrounding said thrust disc, and for coupling the rotatable member to the stationary member through axially-directed magnetic flux;

wherein the first and second bearing means provide controlled radial, thrust and moment load support of the rotatable member relative to the stationary member.

2. An electromagnetic bearing structure as set forth in claim 1, including means for controlling the magnetic field of the first bearing means to levitate and provide radial load support for the rotatable member with respect to the stationary member, and means for controlling the magnetic field of the second bearing means to levitate and provide thrust and moment support for the rotatable member with respect to the stationary member.

3. An electromagnetic bearing structure as set forth in claim 2, wherein means for controlling includes two position sensors to detect and compensate for radial displacement, and three position sensors to detect and compensate for axial and moment displacement of the rotatable member with respect to the stationary member.

4. An electromagnetic bearing structure as set forth in claim 1, wherein the first bearing means comprises:

means associated with the stationary member, for generating a radially polarized, controllable electromagnetic field surrounding a portion of the rotatable member;

means for directing substantially all magnetic flux from the electromagnetic field generating means radially through a single primary air gap between the rotatable member and the stationary member to provide magnetic flux coupling of the rotatable member to the stationary member; and means associated with the stationary member for generating an axially polarized magnetic field, the axially polarized magnetic field generating means being linked magnetically to the rotatable member through the primary air gap such that substantially all magnetic flux generated by the axially polarized magnetic field generating means to re-oriented to create a high density magnetic field with the magnetic flux generated by the electromagnetic field flux generating means across the primary air gap for flux coupling of the rotatable member to the stationary member.

5. An electromagnetic bearing structure as set forth in claim 4, wherein the electromagnetic field generating means includes an arcuate ring of high magnetic flux permeability, and a plurality of electromagnetic coils circumferentially positioned about the arcuate ring and radially spaced from the rotatable member.

6. An electromagnetic bearing structure as set forth in claim 5, including an arcuately shaped pole piece extending axially outwardly form the arcuate ring, through which the magnetic flux generated by the axially polarized magnetic field generating means is directed axially relative to the arcuate ring and then re-oriented radially, and wherein the axially polarized magnetic field generating means is associated with the arcuate ring and circumscribes the rotatable member to generate a relatively constant magnetic flux through the arcuate ring and across the primary air gap.

7. An electromagnetic bearing structure as set forth in claim 5, wherein the axially polarized magnetic field generating means includes an electromagnetic coil adjacent to the arcuate ring and circumscribing the rotatable member.

8. An electromagnetic bearing structure as set forth in claim 5, wherein the axially polarized magnetic field generating means includes permanent magnet means adjacent to the arcuate ring and generally circumscribing the rotatable member, wherein the permanent magnet means includes an axially polarized, arcuate shaped permanent magnet spaced radially outwardly from the plurality of electromagnetic coils, and wherein the permanent magnet is linked magnetically to the rotatable member through the arcuate ring across the primary air gap and through an arcuately shaped pole piece extending axially outwardly from the arcuate ring which re-orients magnetic flux generated by the permanent magnet radially between the rotatable and stationary members.

9. An electromagnetic bearing structure as set forth in claim 7, including a magnetically permeable armature fixed to and surrounding the rotatable member, wherein the armature extends between and faces the arcuate ring and the pole piece.

10. An electromagnetic bearing structure as set forth in claim 1, wherein the second bearing means comprises:

means associated with the rotatable member and circumscribing a portion of the thrust disc, for generating a radially polarized magnetic field;

first means associated with the stationary member and adjacent to a first side of the thrust disc, for generating an axially polarized, controllable electromagnetic field;

second means associated with the stationary member and adjacent to a second side of the thrust disc, for generating an axially polarized, controllable electromagnetic field; and means for directing substantially all magnetic flux from the first and second means for generating an axially polarized electromagnetic field and the means for generating a radially polarized magnetic field, axially between the thrust disc and the stationary member, to provide magnetic flux coupling of the rotatable member to the stationary member.

11. An electromagnetic bearing structure as set forth in claim 10, wherein the means for generating a radially polarized magnetic field include arcuately shaped permanent magnet means forming a portion of the thrust disc, the permanent magnet means being linked magnetically to the stationary member through two air gaps such that radially directed flux from the permanent magnet means is re-oriented to axially pass through the air gaps to create a high density magnetic field linking the rotatable member to the stationary member.

12. An electromagnetic bearing structure as set forth in claim 11, wherein the first and second means for generating an axially polarized electromagnetic field each include at least three electromagnetic coils circumferentially positioned about the rotatable member and axially spaced from the thrust disc, wherein each electromagnetic coil of the first means for generating an axially polarized electromagnetic field has a matching electromagnetic coil of the second means for generating an axially polarized electromagnetic field, and wherein the electromagnetic coils are axially aligned with the permanent magnet means.

13. An electromagnetic bearing structure as set forth in claim 12, wherein the stationary member includes spaced apart, facing first and second coil housings which circumferentially surround a portion of the rotatable member and wherein the thrust disc is situated between the facing coil housings, wherein each electromagnetic coil of the first means for generating an axially, controllable polarized electromagnetic field is electrically connected and paired with the matching electromagnetic coil of the second means for generating an axially polarized, controllable electromagnetic field, to magnetically link the thrust disc to the coil housings and provide a magnetic flux path for electromagnetically generated flux around the permanent magnet means and the electromagnetic coils.

14. An electromagnetic bearing structure as set forth in claim 13, wherein the permanent magnet means includes a first arcuately shaped permanent magnet within the thrust disc, and a second arcuately shaped permanent magnet within the thrust disc and radially spaced from the first permanent magnet.

15. An electromagnetic bearing structure as set forth in claim 12, including disc position sensor means corresponding to each matching pair of electromagnetic coils, for controlling the positioning of the thrust disc between the matching pair of electromagnetic coils by varying the magnetic flux generated thereby.

16. An electromagnetic bearing structure for supporting a rotatable member in a suspended position with respect to a stationary member, the bearing structure comprising:
   means associated with the stationary member, for generating a radially polarized, controllable electromagnetic field surrounding a portion of the rotatable member;
   means for directing substantially all magnetic flux from the electromagnetic field generating means radially through a single primary air gap between the rotatable member and the stationary member to provide magnetic flux coupling of the rotatable member to the stationary member; and
   means associated with the stationary member for generating an axially polarized magnetic field, the axially polarized magnetic field generating means being linked magnetically to the rotatable member through the primary air gap such that substantially all magnetic flux generated by the axially polarized magnetic field generating means is re-oriented to create a high density magnetic field with the magnetic flux generated by the electromagnetic field generating means across the primary air gap for flux coupling of the rotatable member to the stationary member; wherein the electromagnetic field generating means includes an arcuate ring of high magnetic flux permeability, and a plurality of electromagnetic coils circumferentially positioned about the arcuate ring and radially spaced from the rotatable member; and wherein the axially polarized magnetic field generating means is spaced radially outwardly from the plurality of electromagnetic coils and circumscribes the rotatable member to generate a relatively constant magnetic flux through the arcuate ring and across the primary air gap.

17. An electromagnetic bearing structure as set forth in claim 16, wherein the arcuate ring is of a laminate construction to reduce eddy current effects therein.

18. An electromagnetic bearing structure as set forth in claim 17 including an arcuately shaped pole piece extending axially outwardly from the arcuate ring, through which the magnetic flux generated by the axially polarized magnetic field generating means is directed axially relative to the arcuate ring and re-oriented radially.

19. An electromagnetic bearing structure as set forth in claim 17, wherein the axially polarized magnetic field generating means includes an electromagnetic coil adjacent to the arcuate ring and circumscribing the rotatable member.

20. An electromagnetic bearing structure as set forth in claim 17 wherein the axially polarized magnetic field generating means includes permanent magnet means adjacent to the arcuate ring and generally circumscribing the rotatable member.

21. An electromagnetic bearing structure as set forth in claim 20, wherein the permanent magnet means includes an axially polarized, arcuately shaped permanent magnet linked magnetically to the rotatable member through the arcuate ring across the primary air gap and through an arcuately shaped pole piece extending axially outwardly from the arcuate ring which re-orients magnetic flux generated by the permanent magnet radially between the rotatable and stationary members.

22. An electromagnetic bearing structure as set forth in claim 18, including a magnetically permeable armature fixed to and surrounding the rotatable member, wherein the armature extends between and faces the arcuate ring and the pole piece.

23. An electromagnetic bearing structure for supporting a rotatable member including a thrust disc, in a suspended position with respect to a stationary member, the bearing structure comprising:
   means associated with the rotatable member and circumscribing a portion of the thrust disc, for generating a radially polarized magnetic field;
   first means associated with the stationary member and adjacent to a first side of the thrust disc, for generating an axially polarized, controllable electromagnetic field;
   second means associated with the stationary member and adjacent to a second side of the thrust disc, for generating an axially polarized, controllable electromagnetic field; and
   means for directing substantially all magnetic flux from the first and second means for generating an axially polarized electromagnetic field and the means for generating a radially polarized magnetic field, axially between the thrust disc and the stationary member, to provide magnetic flux coupling of the rotatable member to the stationary member.

24. An electromagnetic bearing structure as set forth in claim 23, wherein the means for generating a radially polarized magnetic field include arcuately shaped permanent magnet means forming a portion of the thrust disc, the permanent magnet means being linked magnetically to the stationary member through two air gaps such that radially directed flux from the permanent magnet means is re-oriented to axially pass through the air gaps to create a high density magnetic field linking the rotatable member to the stationary member.

25. An electromagnetic bearing structure as set forth in claim 24, wherein the first and second means for generating an axially polarized electromagnetic field each include at least three electromagnetic coils circumferentially positioned about the rotatable member and axially spaced from the thrust disc.

26. AN electromagnetic bearing structure as set forth in claim 25, wherein each electromagnetic coil of the first means for generating an axially polarized electromagnetic field has a matching electromagnetic coil of the second means for generating an axially polarized electromagnetic field, and wherein the electromagnetic coils are axially aligned with the permanent magnet means.

27. An electromagnetic bearing structure as set forth in claim 26, wherein the stationary member includes spaced apart, facing first and second coil housings which circumferentially surround a portion of the rotatable member and wherein the thrust disc is situated between the facing coil housings.

28. An electromagnetic bearing structure as set forth in claim 27, wherein each electromagnetic coil of the first means for generating an axially polarized electromagnetic field is electrically connected and paired with the matching electromagnetic coil of the second means for generating an axially polarized electromagnetic field, to magnetically link the thrust disc to the coil housings and provide a magnetic flux path for electromagnetically generated flux around the permanent magnet means and the electromagnetic coils.

29. An electromagnetic bearing structure as set forth in claim 28, wherein the permanent magnet means includes a first arcuately shaped permanent magnet within the thrust disc, and a second arcuately shaped permanent magnet within the thrust disc and radially spaced from the first permanent magnet.

30. An electromagnetic bearing structure as set forth in claim 26, including disc position sensor means corresponding to each matching pair of electromagnetic coils, for controlling the positioning of the thrust disc between the matching pair of electromagnetic coils by varying the magnetic flux generated thereby.

* * * * *

UNITED STATES PATENT AND TRADEMARK OFFICE
CERTIFICATE OF CORRECTION

PATENT NO.  : 5,216,308
DATED       : June 1, 1993
INVENTOR(S) : Crawford R. Meeks It is certified that error appears in the above-identified patent and that said Letters Patent is hereby corrected as shown below:

In column 9, line 43, after "current" delete "n" and insert therefor --in--.

In column 11, line 17, after "means" delete "to" and insert therefor --is--.

In column 11, line 20, before "generating" delete "flux".

In column 11, line 31, delete "form" and insert therefor --from--.

In column 14, line 42, delete "AN" and insert therefor --An--.

Signed and Sealed this

Fifteenth Day of March, 1994

Attest:

BRUCE LEHMAN

*Attesting Officer*        *Commissioner of Patents and Trademarks*